Nov. 21, 1961 F. E. STEPHENS 3,009,986
PROTECTOR SLEEVE FOR ELECTRICAL CONNECTOR
Filed Feb. 23, 1960 2 Sheets-Sheet 1

INVENTOR:
FRANCIS E. STEPHENS

BY Sutherland, Polster & Taylor

ATTORNEYS.

Nov. 21, 1961  F. E. STEPHENS  3,009,986
PROTECTOR SLEEVE FOR ELECTRICAL CONNECTOR
Filed Feb. 23, 1960  2 Sheets-Sheet 2

INVENTOR.
FRANCIS E. STEPHENS
BY
Sutherland, Polster & Taylor

United States Patent Office 3,009,986
Patented Nov. 21, 1961

3,009,986
PROTECTOR SLEEVE FOR ELECTRICAL
CONNECTOR
Francis E. Stephens, St. Louis, Mo., assignor to James R. Kearney Corporation, St. Louis, Mo., a corporation of Delaware
Filed Feb. 23, 1960, Ser. No. 10,488
5 Claims. (Cl. 174—84)

This invention relates to protector sleeves for insulating and shielding an electric joint, and more specifically to a tubular protector sleeve of flexible and resilient material which is adapted by its construction to be telescoped over a splice between two insulated conductors to form an insulated joint protected from the weather and shielded from inadvertent contact by linemen or electricians.

The protector sleeve, according to this invention, can be used as a shield for any electric joint between conductors, but hereinafter described embodiment is intended by its construction to act as a protector sleeve for a splice between insulated electric cables or conductors for example one formed by a type of connector. This type of connector is an aluminum or copper sleeve with sockets at opposite ends which are squeezed onto the cable ends placed in the sockets to form an electric joint or splice. The protector sleeve is generally tubular and is tapered at its ends. The tapered ends are apertured to snugly fit the insulating covering on the cable or conductor, and preferably one of the tapered ends thereof is of reduced wall thickness. The sleeves are inherently flexible and resilient enough, and the apertures in the ends thereof so constructed, that the sleeve can readily telescope over one of the insulating conductors before the splice is made. Thereafter, the sleeve is slid along the conductor until the thin flexible end surrounds the other insulated conductor. During this process, the thin flexible wall at this one end rolls under as it engages the larger diameter of the compression type connector, which prevents injury to this end of the sleeve. After passing over the connector, the flexible sleeve end is rolled out by reverse movement on the conductor. The sleeves are constructed to fit a range of outside diameters, so as to be adapted to conductors of different size, enabling use on joints between different size insulated conductors. Since the material of construction for the sleeve has a relatively high dielectric strength, a sleeve can be applied to a "hot line." This feature adapts the sleeves to such uses as joints between a service line or lines and a house line, and eliminates the time consuming job of taping a joint in a "hot line."

It is one of the objects of the invention to provide for insulating an electric joint.

It is another object of this invention to provide a convenient telescoping preformed sleeve protector for insulating an electric joint or splice.

The following is a clear, concise and exact description of several forms of the invention, illustrating the best examples now contemplated by the inventor for carrying out his invention, which description is illustrated in the accompanying drawings in which.

Figure 1:
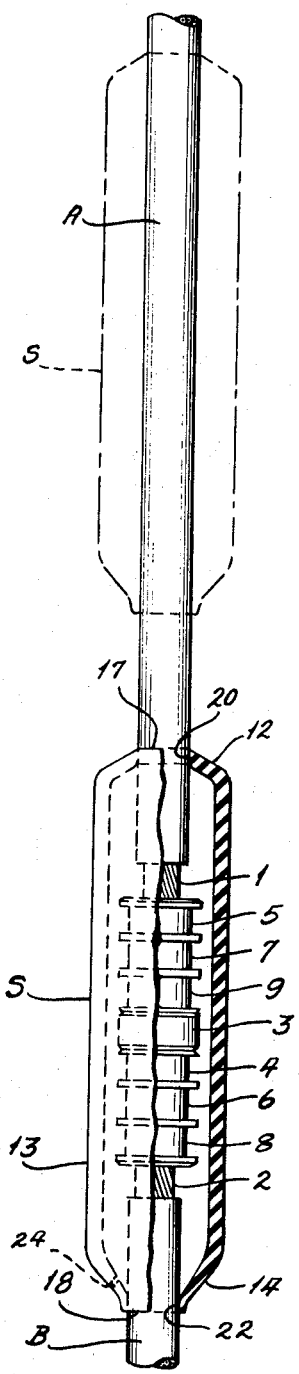
FIG. 1 is an environmental view, partly in section, illustrating the protector sleeve in covering relation with a splice between two conductors.

In the following detailed description, the same reference characters are used to indicate like parts. FIG. 1 shows a pair of conductors A and B which are insulated. The insulation is stripped off the portions 1 and 2 of the ends of these conductors, and the ends inserted in a compression connector 3. In this particular instance, the compression connector is squeezed onto the end of each of the cables A and B to form the splice, and the grooves 5, 7 and 9 in one end of the connector and 3, and 4, 6 and 8 in the opposite end of the connector 3, indicate the impressions made by the tool used for compressing the connector 3 onto the ends of the cables A and B.

A preformed telescoping sleeve protector S, according to this invention, covers the splice connection between the cables A and B. Preferably, this preformed telescoping sleeve protector is generally tubular in shape as at 13, and this portion of the tubular sleeve has a uniform wall thickness. The tubular body portion 13 of the sleeve connector has tapered ends, such as 12 and 14, which are apertured as in 17 and 18 and provided with sealing edges 20 and 22 to tightly grip the outside of the insulation on the cables A and B, respectively. One or both sealing edges may be rolled, reinforced edge or they may be thin flexible sections surrounding the aperture. At least one end, such as 14, is constructed thinner than the body portion 13 for reasons which will later appear. This preformed telescoping sleeve protector can be composed of rubber, or rubber compositions, or other plastics, such as polyethylene, and may be molded or formed by a dipping process into the shape, such as shown in FIG. 1. The thin tapered end, such as 14 shown in drawings, must be resilient enough so that the aperture therein may expand to nearly twice its size, and, for this reason, the tapered end wall is preferred. And the material should be chosen which will have sufficient inherent resilience to accommodate this expansion and contraction at least once, plus, of course, suitable weathering characteristics.

*Operation*

Figure 2:
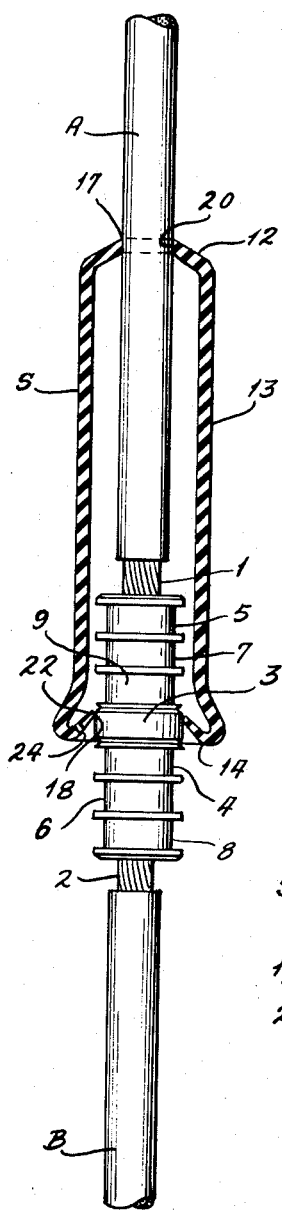
FIG. 2 is an operational view, illustrating the manner in which the flexible end of the protector sleeve accommodates the passage over the larger diameter of the compression connector.
Figure 3:
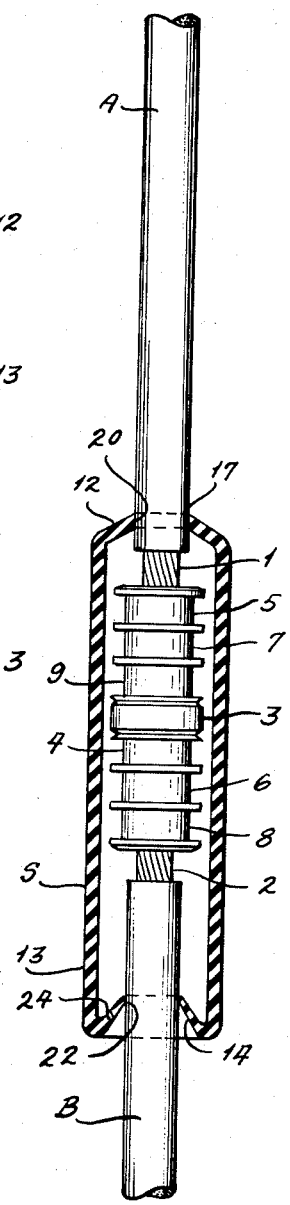
FIG. 3 is an operational view illustrating the relation of the parts after the protector sleeve has passed over the compression connector.

FIGS. 2 and 3 illustrate the manner of operation of this preformed telescoping sleeve protector. Before the splice is made by the compression connector, the sleeve is telescoped over one of the cables, such as A. The two ends of the cables A and B are then interconnected by the compression connector 3. When the splice is complete, the electrician simply grabs the outside of the tubular body portion 13 of the sleeve S and slides the sleeve endwise along the cable A. When the end 14 engages the larger diameter of the compression connector 3, it has sufficient resiliency to roll under as illustrated in FIG. 2. The tapered wall, or thin end wall, section 14 permits the wall to roll under, thus, preventing fraying the thin sealing edge 20 of the aperture 18 by any sharp edges which are on the compression connector fitting 3. Continued sliding action of the sleeve 13 moves the end wall 14 with the sleeve to the position shown in FIG. 3, wherein the end wall 14 is still rolled under. By reversing the sliding action the end wall 14 assumes the position shown in FIG. 1, and the end wall 14 rolls out to make a tight joint between the aperture 18 and the cable B.

When the splice is in a vertical run of cable, it may be desirable to provide a small bleed hole, such as 24, in one of the end walls or the other. This will allow any moisture due to condensation to drain. The preformed telescoping sleeve protector, although intended to be used with a compression type connector sleeve, such as 3, is not an integral part thereof, consequently, it is not affected by the slip of a tool used in compression of the sleeve as are devices now on the market, furthermore, such devices as are now on the market generally have a nylon sleeve integral with the metal compression connector sleeve 3 and separate caps usually of polyethylene or at least a different plastic substance. When the compression tool is applied to the compression connector, it has a tendency to crack the nylon sleeve covering and sometimes causes leakage between the caps and the sleeve. The slip-on type sleeve, disclosed here and constructed as heretofore described, eliminates the necessity of taping the joint and provides a quick, sure and permanent manner of insulating the splice.

First modification

Figure 4:
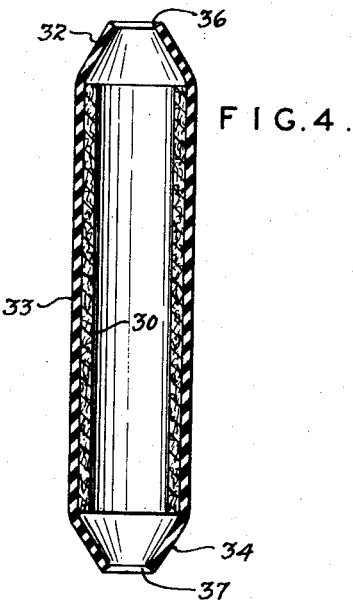
FIG. 4 is a transverse sectional view of a modification of the invention.

The modification, heretofore described, can be generally characterized as a cylindrical sleeve with tapered ends and preferably these tapered ends are of thinner material than the body. This same feature of construction may be obtained by other means, such as illustrated in FIG. 4 for example. In this modification, the body portion of the preformed telescoping sleeve protector is constructed in a different manner. The body portion is reinforced with a stiff sleeve of paper or fiber material, such as 30, which has an inside diameter sufficient to pass over the compression type connector sleeve, such as 3 shown in FIGS. 1-3 heretofore and previously described. The sleeve 30 in turn is surrounded by a flexible sleeve, such as 33 formed in the manner described with reference to FIGS. 1-3 heretofore, the difference between the sleeve in FIG. 4 and the first embodiment described is that the cylindrical portion 33 is the same thickness as the tapered end walls 32 and 34. Both end walls are suitably apertured as at 36 and 37 to make a tight sealing fit with the insulated conductors A and B and the sleeve 30 is long enough so that the terminal ends of sleeve 30 are disposed on the cylindrical part 33 adjacent the inner side of end wall 32 and adjacent the inner side of end wall 34, respectively.

Operation

The insulator sleeve, shown in FIG. 4, is used in the same manner as described for the preceding modification. Before the splice is made by the compression type of connector sleeve, the preformed telescoping sleeve forming the insulating protector for the joint is telescoped over one of the cables, such as A indicated in FIGS. 1-3. The two ends of the cables A and B are then interconnected by the compression type connector, such as 3 also shown in these figures, and when the splice is complete the electrician simply grasps the outside of the tubular body portion 33 of the protector and slides the protector endwise along the cable A. The end 34, which engages the larger diameter of the compression connector 3, has sufficient flexibility to roll under, as illustrated in FIG. 2. Because the protector has a reinforcing tube internally thereof, this rolling under the end is facilitated. Wall 34 or wall 32, as the case may be, as it rolls under on engagement with the connector sleeve stretches, because of the nature of the resilient material of the sleeve 33 allowing the aperture 37 or 36, as the case may be, to enlarge and pass over the connector. Continued sliding action of the sleeve 33 moves the end walls 34 or 32, whichever is the case, beyond the compression connector sleeve 3 to engage the insulation on the cable B. By reversing the sliding action, the end wall 32 or 34 then assumes a right side out position making a tight joint between the end of the telescoping sleeve protector and the insulation of the cables A and B. The reinforcing sleeve 30 prevents any buckling in the center portion of the sleeve 33 as the operation is performed. It is not necessary that the sleeve 30 be of expensive material, for example, it can be impregnated paper in the form of a tube or a plastic tube which has some inherent rigidity.

Second modification

Figure 5:
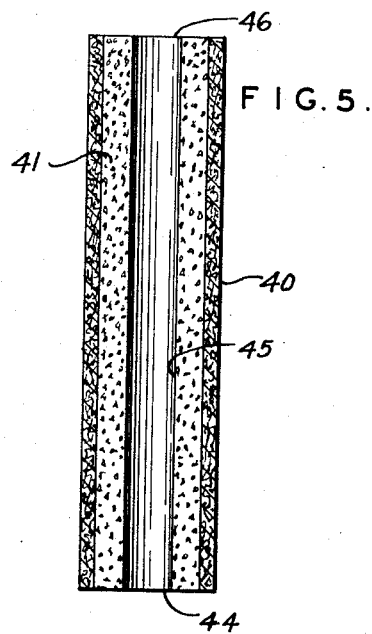
FIG. 5 is a transverse sectional view in elevation illustrating a second modification of the invention.

In the prior modification, the tube 30 was a plain tubular element, but it is contemplated that it can take other forms. One of these forms is illustrated in FIG. 5. For example, in FIG. 5 is shown a reinforcing tube which may be used in the sleeve 33 of FIG. 4, or it may be constructed so as to form a telescoping sleeve protector without the outer sleeve 33 and its tapered ends 32 and 34. The change from one use to the other involves merely a change in length of the protector shown in FIG. 5, and as will be seen if the protector sleeve 40 is the same length as the sleeve 30 then the tapered ends 32 and 34 may be necessary in order to form the tight seal with the insulation on the cables A and B. On the other hand, if the protector sleeve 40 is made of an overall length which will extend beyond the ends of the compression type connector sleeve 3, then the outer sleeve 33 of FIG. 4 would not be necessary, and as will be seen from the following description the protector sleeve 40 will form a good insulating joint without the outer sleeve.

The sleeve 40 is preferably a reinforcing tube with some inherent rigidity and may be formed of a tube of impregnated paper or a rigid tube of plastic material. Within the tube is a core 41 of sponge or closed cell foam 41. Axial passage 45 extends through the core of foam, plastic or rubber from one end 44 to another end opening 46.

Operation

Figure 6:
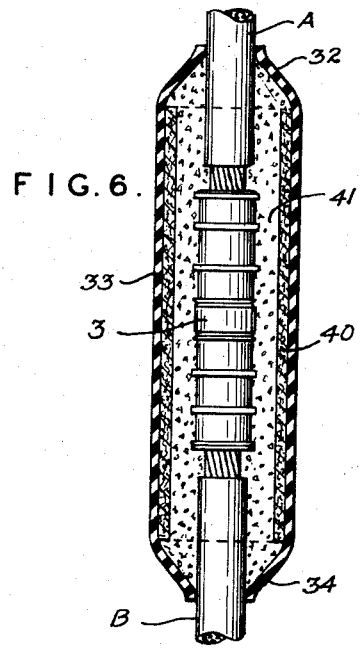
FIG. 6 is an operational view of a modification of the invention showing the action of the cellular core.

If the protector sleeve shown in FIG. 5 is used in combination with a protector sleeve, such as 33, in place of the reinforcing tube 30 in FIG. 4, the operation of the device is exactly the same as therein described. The result obtained from this substitution, however, is slightly different in that when the foam type of core 41 is forced over the larger diameter of the compression connector 3, the foam core is displaced endwise because of the reinforcing tube 40 so as to fill in all of the voids between the end of the compression connector 3 and the ends of the protector sleeve 32 and 34, see FIG. 6. The action of the cellular foam core, as described, will prevent the accumulation of foreign matter by excluding any seepage into the electric joint formed between the cables A and B. In this respect, the cellular foam core 41 performs a new function in the combination not performed by the protector sleeve in either of the previous described modifications.

Third modification

Figure 7:
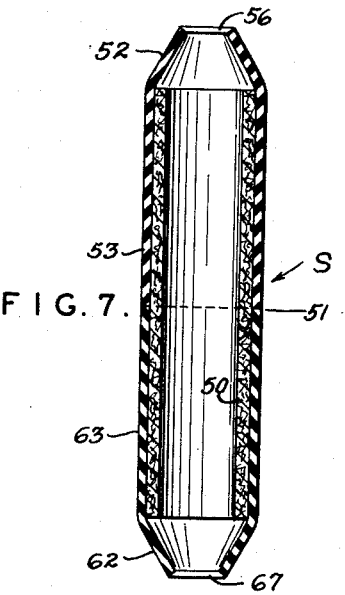
FIG. 7 is a transverse sectional view in elevation illustrating a third modification of the invention.

In the third modification of this invention, the reinforcing tube, such as heretofore described, is surrounded by a two piece sleeve protector member making a three piece type of protector. In this modification, the sleeve 50, shown therein, is identical in construction with the sleeve 30, however, the type of sleeve used is not particularly important and is merely for purposes of illustration. Sleeve 50 is of tubular cross-section and has substantial longitudinal rigidity and in this respect it resembles tube 30. However, the tube 40 would be equally suitable in the combination shown in FIG. 7. In this modification, the sleeve S is split intermediate its length at 51 to form two sleeve parts 53 and 63. Each sleeve part has a tapered end 52 and 62 apertured at 56 and 67. The two sleeve parts 53 and 63 are telescoped onto opposite ends of the sleeve 50 far enough so that the terminal ends of sleeve 50 are disposed on said body parts adjacent the inner side of each of the end walls 52 and 62. It may be desirable in the manufacture to form the sleeve S in two pieces, as shown in FIG. 7, and this is possible where the construction includes a reinforcing tube, such as 50, over which the two separate ends of the sleeve S may be telescoped. The material of the construction of the sleeve S is the same as heretofore described.

*Operation*

The modification in FIG. 7 can be operated in exactly the same way as heretofore described; or it can be operated by placing the sleeve 53 on one cable, such as A, and the sleeve 63 on the other cable, such as B. The reinforcing sleeve 50, regardless of its construction, may be placed on either cable A or B, and then the compression connector sleeve is forced into contact to make the electrical, mechanical connection between the metal ends of the cables A and B. Subsequent to the completion of the electric joint, the sleeve 50, with sleeve part 53 telescoped thereon, is forced over the compression connector 3, as shown in FIGS. 1–3, and then the sleeve part 63 is telescoped over the exposed end of the sleeve 50 to complete the insulated covering for the joint. This particular construction therefore has not only a possible manufacturing advantage, but, in addition, a functional advantage in that it is unnecessary to expand either the apertures 56 or 67 to pass over the compression connector sleeve 3 of the joint.

Several constructions have been described which will fulfill all of the objects of the instant invention, but it is contemplated that other forms or combinations will occur to those skilled in the art which come within the scope of the appended claims.

Having thus described the invention, what is claimed and desired to be secured by Letters Patent is:

1. A preformed telescoping sleeve protector for a splice between insulated electrical conductors wherein the diameter of the splice is larger than the diameter of the conductor comprising, a generally tubular body portion of flexible resilient material longer than said splice, a reinforcing tube for said tubular body, a core of cellular foam material within said reinforcing tube having a passage formed therein from end to end, end walls integrally formed with said body portion, and means forming apertures in said end walls with internal sealing edges dimensioned to snugly engage with the outside of each insulated conductor on each side of said splice and both of said apertures and said core being readily telescoped over the end of one of said conductors before the splice is made, one of said end walls having sufficient lateral flexibility to roll under as the sleeve is slid along the one conductor over the splice so that sealing edges of the aperture do not engage the rough surfaces of the splice, said core of cellular foam material being compressed to fill the voids from one end of the other of said sleeve.

2. In combination a pair of electrical conductors with insulated portions, a connector sleeve forming a splice between the metal ends of said conductors and a preformed telescoping sleeve protector enclosing said splice and extending onto said insulated portions comprising generally tubular body parts of flexible resilient material larger in diameter than said splice, end walls integrally formed on said body parts, and means forming apertures in the end walls with internal sealing edges dimensioned to snugly engage with the outside of each insulated conductor on each side of said joint, and both apertures being dimensioned to readily telescope over the end of one of said insulated conductors before said splice is made, one of said end walls having sufficient lateral flexibility to roll under as the sleeve is slid along the one conductor over the splice so that the sealing edge of the aperture in said end wall does not contact the rough surfaces of the connector sleeve during movement to a position engaging the outside of the other insulated conductor, and a longitudinally rigid open ended tube larger in diameter than said joint and supporting said tubular body parts of flexible material, said tube being dimensioned to surround said sleeve and conductors in spaced relation with one of its ends disposed within one of said body parts adjacent the inner side of said one of said end walls so that an axially directed force applied to said tube in a direction toward said end wall produces said roll under action about the open end of said tube.

3. In combination a pair of electrical conductors with insulated portions, a connector sleeve forming a splice between the metal ends of said conductors and a preformed telescoping sleeve protector enclosing said splice and extending onto said insulated portions comprising generally tubular body parts of flexible resilient material larger in diameter than said splice, end walls integrally formed on said body parts, and means forming apertures in the end walls with internal sealing edges dimensioned to snugly engage with the outside of each insulated conductor on each side of said joint, both of said apertures being dimensioned to readily telescope over the end of one of said insulated conductors before said splice is made, one of said end walls having sufficient lateral flexibility to roll under as the sleeve is slid along the one conductor over the splice so that the sealing edge of the aperture in said end wall does not contact the rough surfaces of the connector sleeve during movement to a position engaging the outside of the other insulated conductor, and a longitudinally rigid open ended tube larger in diameter than said joint mounted in telescopic relation with and supporting said tubular body parts of flexible material, said tube being dimensioned to surround said sleeve and conductors in spaced relation and have one of its terminal ends disposed on one of said body parts adjacent the inner side of said one of said end walls on said part so that an axially directed force applied to said rigid tube in a direction toward said end wall produces said roll under action at the open end of said tube.

4. In combination a pair of electrical conductors with insulated portions, a compression connector sleeve engaging the adjacent ends of said conductors and forming an electrical and mechanical splice therebetween and a preformed telescoping sleeve protector enclosing said splice and extending onto said insulated portions comprising, a generally tubular body portion of flexible resilient material larger in diameter than said joint, end walls integrally formed on said body portion, means forming apertures in the end walls with internal sealing edges dimensioned to snugly engage with the outside of each insulated conductor on each side of said splice, both said apertures being readily telescoped over the end of one of said conductors before said joint is made, one of said end walls having sufficient lateral flexibility to roll under as the sleeve is slid along the one conductor over the splice so that the sealing edge of the aperture in said end wall does not contact the rough surfaces on the splice as it moves over the sleeve and into contact with the insulated portion of the other conductor, and a longitudinally rigid open ended tube larger in diameter than said joint mounted in telescopic relation with and supporting said tubular body of flexible material, said rigid tube being dimensioned to surround said sleeve and conductors in spaced relation and have one of its ends extending on said tubular body to a point adjacent the inner side of said one of said end walls so that an axially directed force applied to said rigid tube in a direction toward said end wall produces said roll under action at the open end of said rigid tube.

5. In combination a pair of electrical conductors with insulated portions thereon, a connector sleeve forming a splice between the metal ends of said conductors and a preformed telescoping sleeve protector enclosing said splice and extending onto said insulated portions comprising a longitudinal rigid open ended tube of insulating material larger in diameter than said splice and longer than said splice from end to end so as to extend over the splice and with its opposite ends surrounding the insulated conductors on either side thereof, a resilient core in said tubular member formed of cellular sponge insulating material, and a longitudinal passage formed in said core dimensioned to tightly engage with the outside of each insulated conductor on each side of the joint and adapted to readily telescope over one end of one of said insulated conductors before said splice is made, said core being substantially coextensive with said tubular member and adapted to be slid along the one conductor over the splice so as to engage the outside of both insulated conductors when a force is applied axially of said tubular member to slide said preformed telescopic sleeve protector along one conductor toward the other.

References Cited in the file of this patent

UNITED STATES PATENTS

| | | |
|---|---|---|
| 598,109 | Osgood et al. | Feb. 1, 1898 |

FOREIGN PATENTS

| | | |
|---|---|---|
| 543,130 | Germany | Feb. 1, 1942 |
| 573,920 | Great Britain | Dec. 12, 1945 |
| 216,818 | Australia | Aug. 29, 1958 |

OTHER REFERENCES

Ser. No. 298,490, Hoekstra (A.P.C.), published May 18, 1943.